US006934397B2

(12) United States Patent
Madievski et al.

(10) Patent No.: US 6,934,397 B2
(45) Date of Patent: Aug. 23, 2005

(54) METHOD AND DEVICE FOR SIGNAL SEPARATION OF A MIXED SIGNAL

(75) Inventors: Anton Madievski, Maroubra (AU); Mark Thomson, Carlton (AU)

(73) Assignee: Motorola, Inc., Schaumburg, IL (US)

( * ) Notice: Subject to any disclaimer, the term of this patent is extended or adjusted under 35 U.S.C. 154(b) by 352 days.

(21) Appl. No.: 10/252,274

(22) Filed: Sep. 23, 2002

(65) Prior Publication Data

US 2004/0057585 A1 Mar. 25, 2004

(51) Int. Cl.[7] ................................................ H04B 15/00
(52) U.S. Cl. ........................ 381/94.1; 381/92; 381/71.1
(58) Field of Search ........................ 381/92, 71.1, 94.1; 704/200, 226; 348/14.01

(56) References Cited

U.S. PATENT DOCUMENTS

| | | | | |
|---|---|---|---|---|
| 5,625,697 A | * | 4/1997 | Bowen et al. ................ | 381/92 |
| 2004/0034723 A1 | * | 2/2004 | Giroti ............................ | 710/8 |
| 2004/0041902 A1 | * | 3/2004 | Washington ............. | 348/14.01 |

FOREIGN PATENT DOCUMENTS

| | | |
|---|---|---|
| WO | WO 98/58450 | 12/1998 |
| WO | WO 01/76319 | 10/2001 |

OTHER PUBLICATIONS

Cardoso, J.–F., "Blind signal separation: statistical principles", Oct. 1998, Proceedings of the IEEE , vol.: 86 , Issue: 10, pp.: 2009–2025.*

Zhang, L. and Cichocki, A. "Blind Deconvolution of Dynamical Systems; A State Space Approach". Journal of Signal Processing vol. 4, No. 2, Mar. 2000, pp. 111–130.

* cited by examiner

*Primary Examiner*—Brian T. Pendleton

(57) ABSTRACT

A method (20) and electronic device (1) for signal separation of mixed signals provided by sensors (11,13), the mixed signals resulting from the sensors (11,13) detecting respective mixed waveforms comprising a plurality of source waveforms originating from waveform generating sources mixed in a mixing environment (10). The method (20) and device (1), in use, provide for configuring (22) communication between a processor (3) and a plurality of the sensors (11,13) in the mixing environment (10), the configuring being effected dynamically depending upon variations in the number of sensors (11,13) in the environment. At a receiving step (23) the processor (3) receives respective mixed signals from the sensors (11,13) and a step of determining (24) un-mixing parameters for the environment based on the number of sensors (11,13) is then effected. Thereafter, a step of applying selectively (35) applies the un-mixing parameters to at least one of said mixed signals to thereby separate at least one of the mixed signals and provide at least one output source signal associated with one of the sensors (11,13), the output source signal being indicative of an unmixed one of the source waveforms.

18 Claims, 2 Drawing Sheets

METHOD AND DEVICE FOR SIGNAL SEPARATION OF A MIXED SIGNAL

FIELD OF THE INVENTION

This invention relates to a signal separation of mixed signals signal originating from a waveform mixing environment having a plurality of sensors providing the mixed signals. The invention is particularly useful for, but not necessarily limited to, signal separation of mixed signals originating from sensors in a mixing environment where the number of sensors may vary.

BACKGROUND ART

Environments with multi-sensors are becoming widely used in order to separate signals originating from mixing environments, that have more than one signal source, such as conference rooms and offices with air conditioning, computers and people creating audio signals.

Separation of multiple signals from their superposition recorded at several sensors is an important problem that shows up in a variety of applications such as communications, biomedical and speech processing. The separation task is made difficult by the fact that very little is known about the input signals and thus the separation is commonly referred to as blind signal separation as describe in Zhang and A. Cichocki, "Blind Deconvolution of Dynamical Systems: A State Space Approach', *Journal of Signal Processing*, vol. 4, No. 2, March 2000, pp. 111–130.

In WO9858450 there is described a method and apparatus for signal separation of a mixed signal originating from a waveform mixing environment. The method and apparatus use blind signal separation and is only applicable to a mixing environment where the number of associated sensors remains constant.

In WO0176319 there is also described a method and apparatus for signal separation of a mixed signal originating from a waveform mixing environment. The method and apparatus use sensor array technology with predetermined microphone positions and is only applicable to a mixing environment where the number of associated sensors remains constant and stationary.

Ideally, the number of sensor should be at least equal to, if not greater than, the number of signals sources in order to effectively provide effective waveform separation. Thus, static separation systems with having a constant number of sensors are not suitable for dynamic environments in which the maximum number of signals sources cannot be determined.

In this specification, including the claims, the terms 'comprises', 'comprising' or similar terms are intended to mean a non-exclusive inclusion, such that a method or apparatus that comprises a list of elements does not include those elements solely, but may well include other elements not listed.

SUMMARY OF THE INVENTION

According to one aspect of the invention there is provided a method for signal separation of mixed signals provided by sensors, the mixed signals resulting from the sensors detecting respective mixed waveforms comprising a plurality of source waveforms originating from waveform generating sources mixed in a mixing environment, the method including the steps of:

configuring communication between a processor and a plurality of the sensors in the mixing environment, the configuring being effected dynamically depending upon variations in the number of sensors in the environment;

receiving, by said processor, respective said mixed signals from the sensors;

determining un-mixing parameters for the environment based on the number of sensors; and applying selectively said un-mixing parameters to at least one of said mixed signals to thereby separate said at least one of said mixed signals and provide at least one output source signal associated with one of the sensors, the output source signal being indicative of an unmixed one of said source waveforms.

Preferably, the step of configuring communication can be effected by said processor repeatedly checking for the presence of sensors in the mixing environment and configuring communication between said processor and sensors that are detected in the environment.

Suitably, the repeatedly checking for the presence of sensors may be characterized by at least some of the sensors repeatedly sending a presence signal to the processor.

Preferably, the step of configuring communication can be further characterized by the processor repeatedly updating a presence list of sensors in the environment, the presence list being indicative of the sensors in the environment that are in communication with the processor.

In one form, the step of determining un-mixing parameters may be suitably effected by Blind Signal Separation.

Preferably, the Blind Signal Separation may be effected by solving an equation $[W, D]=\text{eig}(X X^T, R)$, where X is a N×T mixed signal matrix containing T samples of N sensor readings of mixed signals (N being the number of sensors in the environment that were configured in the step of configuring 22); and eig is an the generalised eigenvalue procedure that is defined as $[V, D]=\text{eig}(A,B)$ for $A.V=B.\ V.\ D$, i.e. V jointly diagonalises A and B, and R is a matrix based on assumptions imposed on the source signals.

Suitably, the step of applying selectively may be characterized by separating the mixed signals to provide a said output source signal for each of said sensors.

Preferably, the step of applying selectively may be effected by the output source signals being separated all at once by use of an equation $S=W^TX$, where S is a matrix of the output source signals.

In another form, the step of applying selectively may be effected by the output source signals being separated individually as a product of particular row of the matrix $W^T$ and column of the matrix X.

Suitably, after the step of applying selectively there may be a further step of transmitting said at least one output source signal.

According to another aspect of the invention there is provided an electronic device for signal separation of mixed signals provided by sensors operatively coupled to the device, the mixed signals resulting from the sensors detecting respective mixed waveforms comprising a plurality of source waveforms originating from waveform generating sources mixed in a mixing environment, the electronic device comprising a processor having a memory coupled thereto, the memory storing operating code for the processor;

a sampler having for receiving the mixed signals from the sensors, the sampler being coupled to the processor, wherein in sue the operating code effects the steps of:

configuring communication between the processor and plurality of the sensors in the mixing environment, the configuring being effected dynamically depending upon variations in the number of sensors in the environment;

receiving, by said processor, respective said mixed signals from the sensors;

determining un-mixing parameters for the environment based on the number of sensors; and applying selectively said un-mixing parameters to at least one of said mixed signals to thereby separate said at least one of said mixed signals and provide at least one output source signal associated with one of the sensors, the output source signal being indicative of an unmixed one of said source waveforms.

Preferably, in the step of configuring communication the operating code may control the processor to repeatedly check for the presence of sensors in the mixing environment and configure communication between said processor and sensors that are detected in the environment.

In one form, the device may effect the step of determining un-mixing parameters by Blind Signal Separation.

Preferably, the device may effect Blind Signal Separation by solving an equation $[W, D]=\mathrm{eig}(X X^T, R)$, where X is a N×T mixed signal matrix containing T samples of N sensor readings of mixed signals (N being the number of sensors in the environment that were configured in the step of configuring 22); and eig is an the generalised eigenvalue procedure that is defined as $[V, D]=\mathrm{eig}(A,B)$ for $A.V=B.\ V.\ D$, i. e. V jointly diagonalises A and B, and R is a matrix based on assumptions imposed on the source signals.

Suitably, the device may effect the step of applying selectively by separating the mixed signals to provide a said output source signal for each of said sensors.

Preferably, the device may effect the step of applying selectively by the output source signals being separated all at once by use of an equation $S=W^TX$, where S is a matrix of the output source signals.

In another form, the device may effect the step of applying selectively by the output source signals being separated individually as a product of particular row of the matrix $W^T$ and column of the matrix X.

Suitably, device may have a transmitter for transmitting said at least one output source signal.

BRIEF DESCRIPTION OF THE DRAWINGS

In order that the invention may be readily understood and put into practical effect, reference will now be made to a preferred embodiment as illustrated with reference to the accompanying drawings in which.

DETAILED DESCRIPTION OF THE PREFERRED EMBODIMENT OF THE INVENTION

Figure 1:
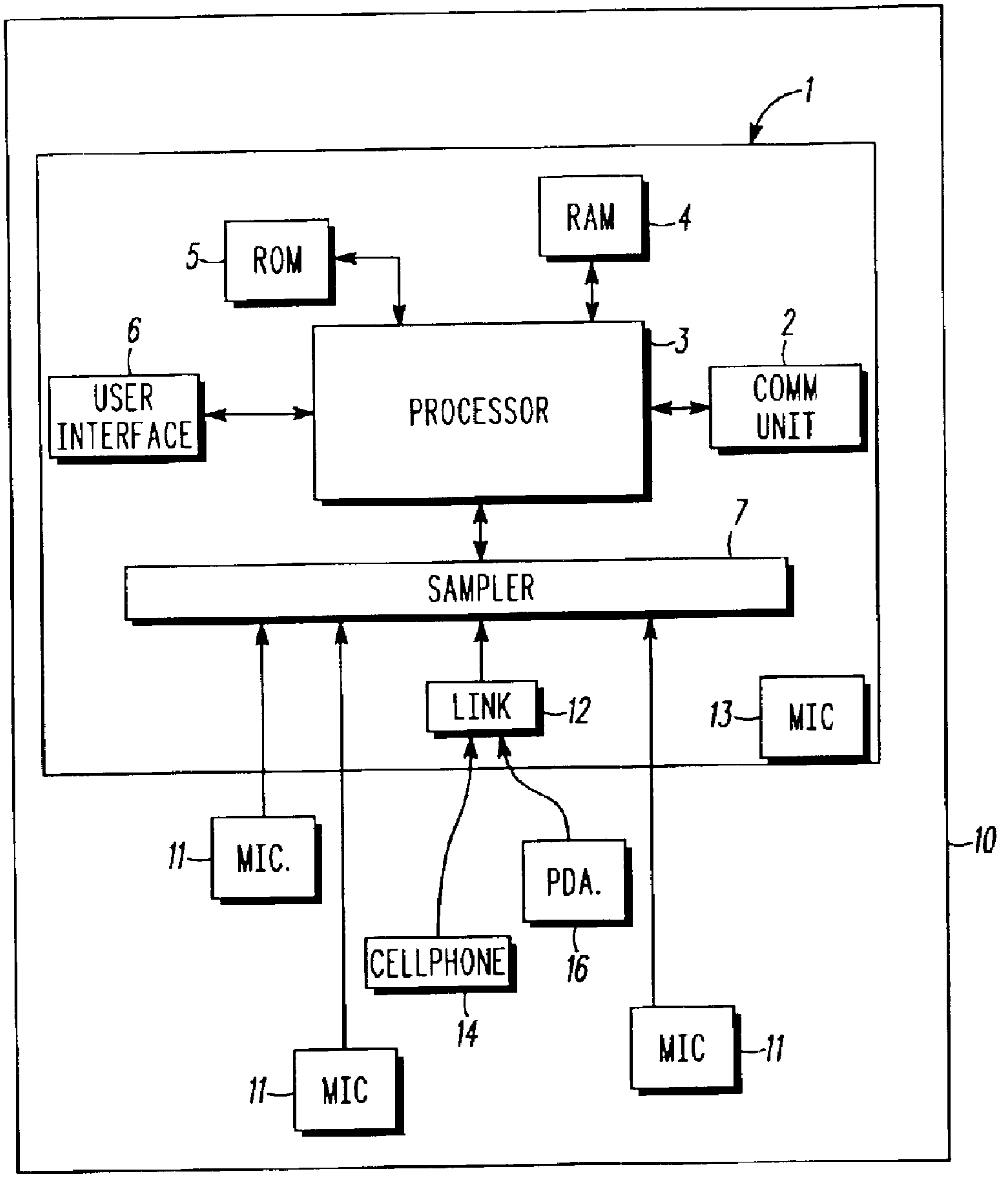
FIG. 1 is a block diagram illustrating an embodiment of an electronic device in accordance with the invention.

In the drawings, like numerals on different Figs. are used to indicate like elements throughout. With reference to FIG. 1, there is illustrated an electronic device 1 in a dynamic environment 10 that has a plurality of waveform sources. The device 1 has a processor 3 with an associated Random Access Memory (RAM) 4, Read Only Memory (ROM) 5, User Interface 6 and communications unit 2. There is also a sampler 7 coupled to the processor 3 and a radio link 12 is coupled to the sampler. The User Interface 6 is typically a speaker, keypad and a visual display unit.

Also in the dynamic environment 10 are a plurality of static sensors in the form of microphones 11 that are directly coupled to the sampler 7. Furthermore, there is also a sensor in the form of an integrated microphone 13 mounted to the device 1. There are also dynamic sensors Ds in the form microphones of a cellphone 14 and a Personal Digital Assistant 16 in the mixing environment, both being in communication with the sampler 7 via the by the radio link 12 that is preferably a Bluetooth™ system in accordance with the Specification available at www.bluetooth.com, and incorporated by reference into this specification. However, as will be apparent to a person skilled in the art other links such as Infra Red links can also be used. In this specification, sensors refer to one or any combination of the microphones 11,13 and dynamic sensors Ds, that are operatively coupled to the device 1, and in use provide the plurality of signal sources to the device 1.

Figure 2:
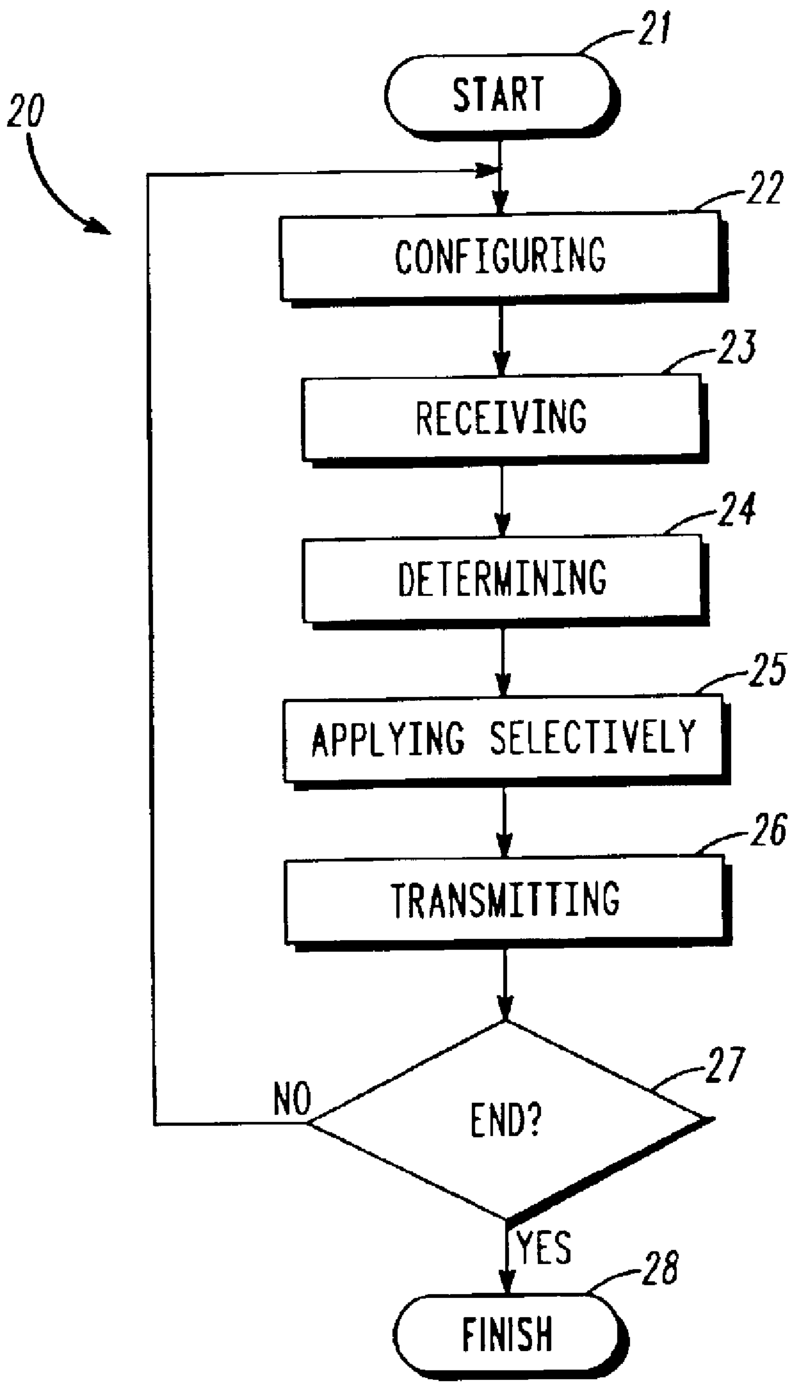
FIG. 2 is a flow diagram illustrating a method for signal separation of mixed signals implemented on the device of FIG. 1.

Referring to FIG. 2 there is illustrated a method 20 for signal separation of mixed signals provided by the sensors in the form of microphones 11,13 and dynamic sensors Ds. The mixed signals result from the sensors detecting respective mixed waveforms comprising a plurality of source waveforms originating from waveform generating sources mixed in the mixing environment 10. The method 20 comprises a step start step 21 effected by a user actuating keys on the user interface 6. The start step 20 is followed by a step of configuring 22 communication between a processor 3 and a plurality of the sensors in the mixing environment 10, the configuring being effected dynamically depending upon variations in the number sensors. In the step of configuring 22 communication the processor 3 repeatedly updates a presence list of sensors in the environment, the presence list being indicative of the sensors in the environment that are in communication with the processor 3. This is achieved by the cellphone 14 or Personal Digital Assistant 16 repeatedly sending a presence signal Ps to the Sampler 2 via the link 12 which in turn is received by the processor 3. The microphones 11 can also repeatedly send a presence signal Ps to processor 3 as the number of these sensors can vary (note microphone 13 is permanently coupled to the processor 3 and need not necessarily send a presence signal Ps).

The processor 3, having a downloaded operating code from ROM 5, repeatedly updates a presence list of detected sensors DS and microphones 11 present in the mixing environment 10, the presence list being stored in RAM 4.

A step of receiving 23 is then effected whereby received by the processor 3 are respective mixed signals from each of the sensors. Thereafter, a step of determining 24 is effected for determining un-mixing parameters for the environment 10, the un-mixing parameters being based on the number of sensors. The determining is typically achieved by one of the well known Blind Signal Separation techniques such as the techniques described by Cardoso, J. F. "Blind signal separation: statistical principles", Proc. of the IEEE, vol. 9, no. 10, pp. 2009–2026, October 1998. The Blind Signal Separation technique described by Cardoso is incorporated into this specification by reference.

To determine the unmixing paramers an un-mixing matrix W comprised of un-mixing parameters is determined from:

$$[W,D]=\mathrm{eig}(X X^T, R)\text{–}(1)$$

where X is N×T mixed waveform matrix containing T samples of N sensor readings of mixed signals (N being the number of sensors in the environment that were configured in the step of configuring 22); and eig is an the generalised eigenvalue procedure that is defined as [V,D]=eig(A,B) for A.V=B.V.D, i. e. V jointly diagonalises A and B.

The choice of matrix R depends on the assumptions imposed on the source signals. For instance: for non-white source signals R=cross-correlation at some delay $\tau_2$, for non-stationary source signals R=covariance at different time $t_2$; and for non-Gaussian source signals R=cumulant of some higher order m.

After the step of determining 24, the step of applying 25 is effected 2 to apply selectively the un-mixing parameters to at least one of the mixed signals to thereby separate at least one of the mixed signals and provide at least one output source signal associated with one of the sensors, the output source signal being indicative of an unmixed one of the source waveforms.

The source signals are typically separated all at once by use of the following equation:

$$S=W^TX\text{–}(2)$$

W where S is a matrix of the output source signals.

Alternatively, the output source signals may be separated individually as a product of particular row of the matrix $W^T$ and column of the matrix X.

The output source signal is then transmitted by the communications unit 2 at a step of transmitting 26.

A test step 27 then determines if the user has actuated the keypad on the user interface in order to end the method 20, if no keys are actuated then the method 20 returns to the step of configuring 22, otherwise the method terminates at a finish step 28.

Advantageously, the invention allows for waveform separation to provide one or more output signals from a mixed signals originating in a mixing environment where the number of sensors may vary. For instance, if the electronic device 1 is a conferencing communication unit that is located in a room then one of the integrated microphone 13 that is mounted to the conferencing communication unit. The other microphones 11 would be typically located at strategic locations in the room that forms the mixing environment 10.

In use, a user would make a telephone conference call by actuating a keypad of the user interface 6 and a call is set up via the communication unit 2 that is linked to a telephone trunking system or by any other communication medium. During the conference call one numerous people in the mixing environment may speak concurrently and ambient noise provides part of a mixed signal provided by the integrated microphone 13. Further mixed signal are provided by the microphones 11 and dynamic sensors Ds that detect noise and speech in the environment. Because devices such as the cellphone 14 and personal digital assistant 16 may only be temporarily in the environment, the method 20 dynamically configures communication between all the sensors and the processor 3 to thereby improve signal separation.

Signal separation is improved because the increased number of sensors increase the ratio of number of sensors to the number of noise sources that can vary depending for instance on the number of people in the environment. Thus, an improved output signal representing speech that was intended for communication and input to the integrated microphone 13 can be separated from noise in the environment and transmitted by the communication unit 2. Although, this example describes the electronic device 1 as a conferencing communication unit, the device can be any suitable device that requires signal separation such as a cellphone or two-way radio.

The detailed description provides a preferred exemplary embodiment only, and is not intended to limit the scope, applicability, or configuration of the invention. Rather, the detailed description of the preferred exemplary embodiment provides those skilled in the art with an enabling description for implementing a preferred exemplary embodiment of the invention. It should be understood that various changes may be made in the function and arrangement of elements without departing from the spirit and scope of the invention as set forth in the appended claims.

We claim:

1. A method for signal separation of mixed signals provided by sensors, the mixed signals resulting from the sensors detecting respective mixed waveforms comprising a plurality of source waveforms originating from waveform generating sources mixed in a mixing environment, the method including the steps of:

configuring communication between a processor and a plurality of the sensors in the mixing environment, the configuring being effected dynamically depending upon variations in the number of sensors in the environment, wherein said processor repeatedly checks for the presence of sensors in the mixing environment to effect the configuring communication between said processor and sensors that are detected in the environment;

receiving, by said processor, respective said mixed signals from the sensors;

determining un-mixing parameters for the environment based on the number of sensors; and applying selectively said un-mixing parameters to at least one of said mixed signals to thereby separate said at least one of said mixed signals and provide at least one output source signal associated with one of the sensors, the output source signal being indicative of an unmixed one of said source waveforms.

2. A method as claimed in claim 1, wherein the repeatedly checking for the presence of sensors is characterized by at least some of the sensors repeatedly sending a presence signal to the processor.

3. A method as claimed in claim 2, wherein the step of configuring communication is further characterized by the processor repeatedly updating a presence list of sensors in the environment, the presence list being indicative of the sensors in the environment that are in communication with the processor.

4. A method as claimed in claim 1, wherein, the step of determining un-mixing parameters is effected by Blind Signal Separation.

5. A method as claimed in claim 4, wherein y, the Blind Signal Separation is effected by solving an equation [W, D]=eig(X $X^T$, R), where X is a N×T mixed signal matrix containing T samples of N sensor readings of mixed signals (N being the number of sensors in the environment that were configured in the step of configuring 22); and eig is an the generalised eigenvalue procedure that is defined as [V, D]=eig(A, B) for A.V=B.V.D, i.e. V jointly diagonalises A and B, and R is a matrix based on assumptions imposed on the source signals.

6. A method as claimed in claim 1, wherein, the step of applying selectively is characterized by separating the mixed signals to provide a said output source signal for each of said sensors.

7. A method as claimed in claim 1, wherein the step of applying selectively is effected by the output source signals being separated all at once by use of an equation $S=W^TX$, where S is a matrix of the output source signals.

8. A method as claimed in claim 1, wherein the step of applying selectively is effected by the output source signals being separated individually as a product of particular row of the matrix $W^T$ and column of the matrix X.

9. A method as claimed in claim 1, wherein, after the step of applying selectively there is a further step of transmitting said at least one output source signal.

10. An electronic device for signal separation of mixed signals provided by sensors operatively coupled to the device, the mixed signals resulting from the sensors detecting respective mixed waveforms comprising a plurality of source waveforms originating from waveform generating sources mixed in a mixing environment, the electronic device comprising a processor having a memory coupled thereto, the memory storing operating code for the processor;

a sampler for receiving the mixed signals from the sensors, the sampler being coupled to the processor, wherein in use the operating code effects the steps of:

configuring communication between the processor and plurality of the sensors in the mixing environment, the configuring being effected dynamically depending upon variations in the number of sensors in the environment by said processor repeatedly checking for the presence of sensors in the mixing environment to effect the configuring communication between said processor and sensors that are detected in the environment;

receiving, by said processor, respective said mixed signals from the sensors;

determining un-mixing parameters for the environment based on the number of sensors; and applying selectively said un-mixing parameters to at least one of said mixed signals to thereby separate said at least one of said mixed signals and provide at least one output source signal associated with one of the sensors, the output source signal being indicative of an unmixed one of said source waveforms.

11. An electronic device as claimed in claim 10, wherein the device effects the step of determining un-mixing parameters by Blind Signal Separation.

12. An electronic device as claimed in claim 11, wherein the device effects Blind Signal Separation by solving an equation $[W, D]=eig(X X^T, R)$, where X is a N×T mixed signal matrix containing T samples of N sensor readings of mixed signals (N being the number of sensors in the environment that were configured in the step of configuring 22); and eig is an the generalised eigenvalue procedure that is defined as [V, D]=eig(A, B) for A.V=B. V. D,i.e. V jointly diagonalises A and B, and R is a matrix based on assumptions imposed on the source signals.

13. An electronic device as claimed in claim 10, wherein the device effects the step of applying selectively by separating the mixed signals to provide a said output source signal for each of said sensors.

14. An electronic device as claimed in claim 10, wherein, the device effects the step of applying selectively by the output source signals being separated all at once by use of an equation $S=W^T X$, where S is a matrix of the output source signals.

15. An electronic device as claimed in claim 10, wherein the device effects the step of applying selectively by the output source signals being separated individually as a product of particular row of the matrix $W^T$ and column of the matrix X.

16. An electronic device as claimed in claim 10, wherein device has a transmitter for transmitting said at least one output source signal.

17. A method as claimed in claim 10, wherein the repeatedly checking for the presence of sensors is characterized by at least some of the sensors repeatedly sending a presence signal to the processor.

18. A method as claimed in claim 10, wherein the step of configuring communication is further characterized by the processor repeatedly updating a presence list of sensors in the environment, the presence list being indicative of the sensors in the environment that are in communication with the processor.

* * * * *